US006021364A

United States Patent [19]

Berliner et al.

[11] Patent Number: 6,021,364

[45] Date of Patent: Feb. 1, 2000

[54] ACOUSTIC HIGHWAY MONITOR

[75] Inventors: Edward Fredrick Berliner, Randolph, N.J.; John Patrick Kuhn, Woodbridge; Scott Andrew Rawson, Fairfax, both of Va.; Anthony Donald Whalen, Rockaway, N.J.

[73] Assignee: Lucent Technologies Inc., Murray Hill, N.J.

[21] Appl. No.: 08/069,957

[22] Filed: May 28, 1993

[51] Int. Cl.$^{7}$ .......... B60Q 5/00

[52] U.S. Cl. .......... 701/1; 340/943

[58] Field of Search .......... 364/436, 437, 364/439; 340/943

[56] References Cited

U.S. PATENT DOCUMENTS

| | | | |
|---|---|---|---|
| 3,047,838 | 7/1962 | Hendricks | 364/437 |
| 3,233,084 | 2/1966 | Kendall et al. | 364/437 |
| 3,397,304 | 8/1968 | Auer, Jr. | 364/437 |
| 3,445,637 | 5/1969 | Auer, Jr. | 364/437 |
| 3,760,343 | 9/1973 | Auer, Jr. | 367/93 |
| 3,895,344 | 7/1975 | Gill, Jr. et al. | 340/943 |
| 4,163,283 | 7/1979 | Darby | 364/439 |
| 4,789,941 | 12/1988 | Nunberg | 364/436 |
| 5,060,206 | 10/1991 | DeMetz, Sr. | 367/136 |
| 5,250,946 | 10/1993 | Stanzcyk | 364/437 |

*Primary Examiner*—Kevin J. Teska
*Assistant Examiner*—Russell W. Frejd
*Attorney, Agent, or Firm*—Jason P. DeMont; Martin I. Finston

[57] ABSTRACT

A method and apparatus for acoustically monitoring a highway is disclosed which is inexpensive to maintain and install and does not require that the roadway be closed, torn-up or repaved. These results are obtained in an illustrative embodiment of the present invention which comprises a Mill's Cross acoustic array mounted proximate to a highway, spatial discrimination circuitry, frequency discrimination circuitry and interface circuitry that generates a binary signal which indicates when a motor vehicle is, or is not, within a detection zone on the roadway.

4 Claims, 3 Drawing Sheets

ACOUSTIC HIGHWAY MONITOR

FIELD OF THE INVENTION

The present invention relates to highway monitoring systems in general and, more specifically, to systems which detect and signal the existence of a motor vehicle within a predefined detection zone on the roadway.

BACKGROUND OF THE INVENTION

Highway departments use a variety of techniques to monitor traffic in an effort to detect, mitigate, and prevent congestion. Typically, each highway department has a command center that receives and integrates a plurality of signals transmitted by monitoring systems located along the highway. Although different kinds of monitoring systems are used, the most prevalent employs a roadway metal detector. A wire loop is embedded in the roadway and its terminals are connected to detection circuitry that measures the inductance changes in the wire loop. Because the inductance in the wire loop is perturbed by a motor vehicle (comprising a quantity of ferromagnetic material) passing over it, the detection circuitry can detect when a motor vehicle is over the wire loop. Based on this perturbation, the detection circuitry creates a binary signal, called a "loop relay signal," which is transmitted to the highway department's command center. The command center gathers the respective loop relay signals and from them makes a determination as to the likelihood of congestion. The use of wire loops is, however, disadvantageous for several reasons.

First, a wire loop system will not detect a motor vehicle unless the motor vehicle comprises sufficient ferromagnetic material to create a noticeable perturbation in the inductance in the wire loop. And because the trend is to fabricate motor vehicles with non-ferromagnetic alloys, plastics and composite materials, wire loop systems will increasingly fail to detect the presence of motor vehicles. It is already well known that wire loops often overlook small vehicles. Another disadvantage of wire loop systems is that they are expensive to install and maintain. Installation and repair require that a lane be closed, that the roadway be cut and that the cut be sealed. Often too, harsh weather can preclude this operation for several months.

SUMMARY OF THE INVENTION

Embodiments of the present invention monitor highway traffic while avoiding many of the costs and restrictions associated with prior techniques. Specifically, embodiments of the present invention can be installed and maintained in any weather and do not require that the roadway be closed, torn-up or repaved.

These results are obtained in an illustrative embodiment of the present invention which comprises a first electro-acoustic transducer and a second electro-acoustic transducer which receive acoustic energy from a highway and convert the acoustic energy into electrical signals. The electrical signals are then passed through spatial discrimination circuitry, frequency discrimination circuitry and interface circuitry which asserts a binary signal when a motor vehicle is within a detection zone and which retracts the binary signal when no motor vehicle is within the detection zone.

DETAILED DESCRIPTION

Each motor vehicle using a highway radiates acoustic energy from the power plant (e.g., the engine block, pumps, fans, belts, etc.) and from its motion along the roadway (e.g., tire noise due to friction, wind flow noise, etc.). And while the energy fills the frequency band from DC up to approximately 16 KHz, there is a reliable presence of energy from about 3 KHz to 8 KHz. Embodiments of the present invention exploit this observation for the purpose of highway surveillance.

Figure 1:
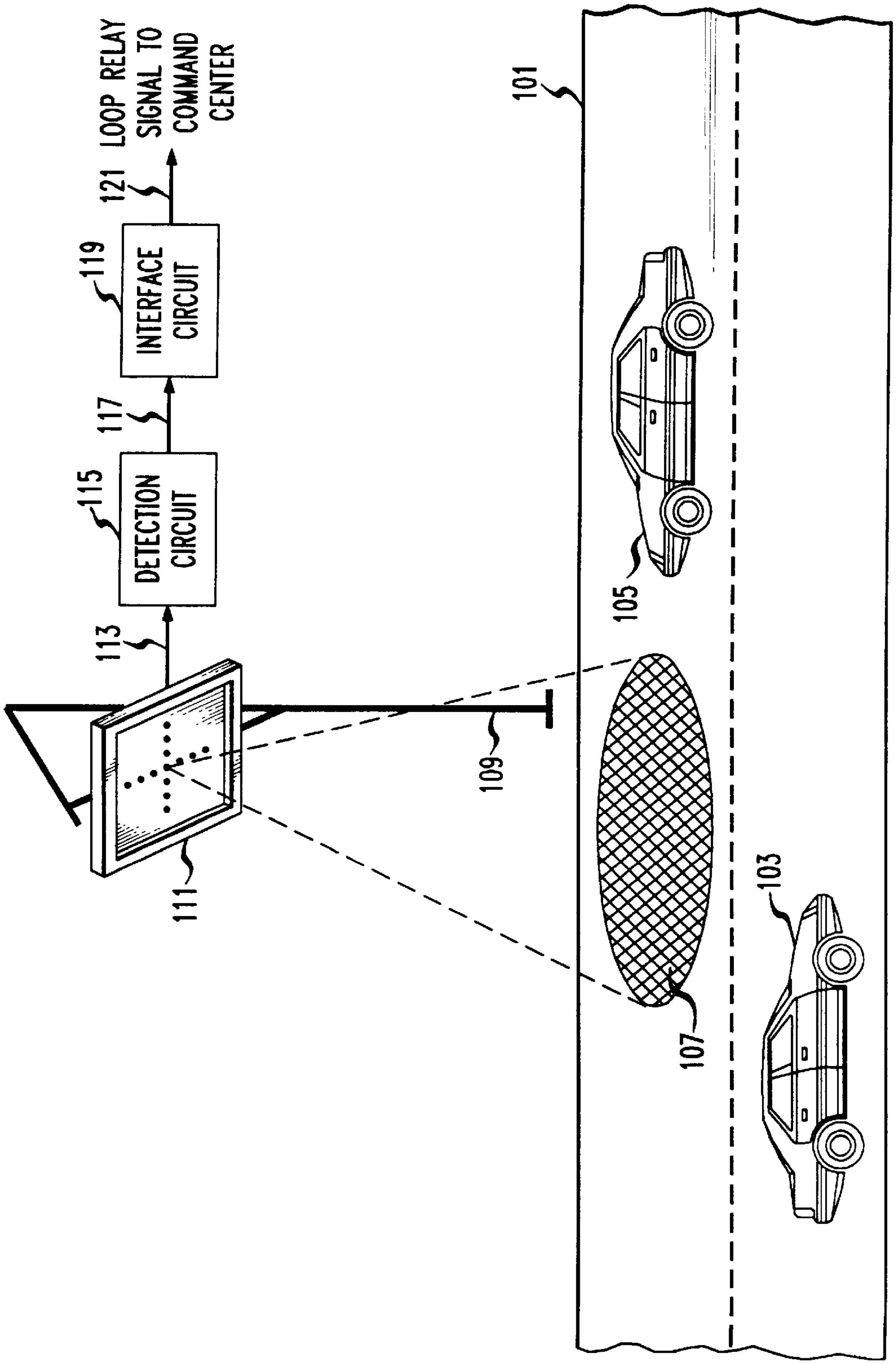
FIG. 1 is a drawing of an illustrative embodiment of the present invention as it is used to monitor the presence or absence of a motor vehicle in a detection zone.

FIG. 1 depicts a drawing of an illustrative embodiment of the present invention that monitors a pre-defined area of roadway, called a "detection zone," for the presence of a motor vehicle within that area. The salient items in FIG. 1 are roadway 101, motor vehicle 103, motor vehicle 105, detection zone 107, microphone array 111, microphone support 109, detection circuit 115 and interface circuit 119 in a roadside cabinet (not shown), electrical bus 113, electrical bus 117 and lead 121.

Figure 2:
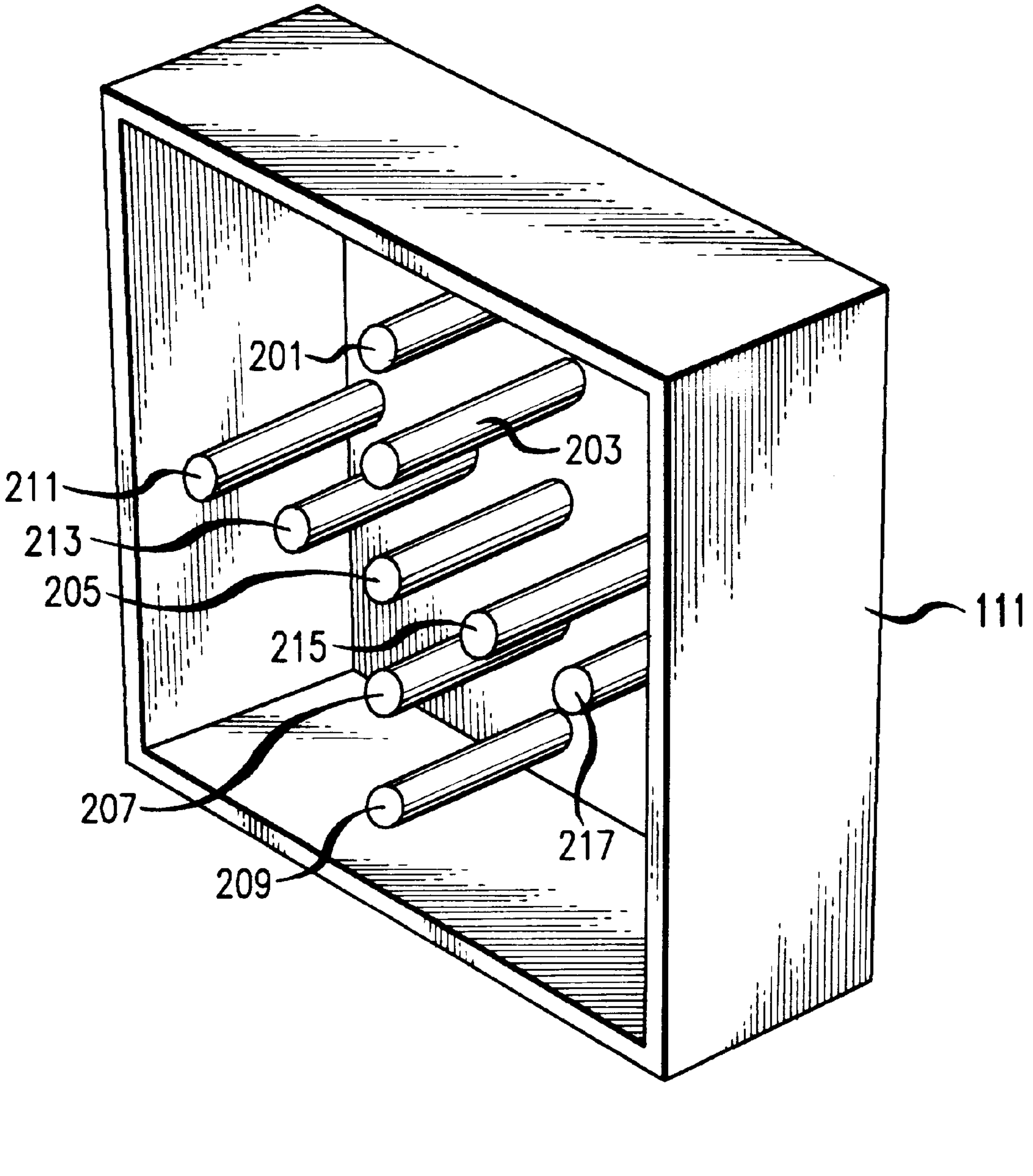
FIG. 2 is a drawing of an illustrative microphone array as can be used in the illustrative embodiment of the present invention.

As shown in FIG. 2, microphone array 111 preferably comprises a plurality of acoustic transducers (e.g., omni-directional microphones), arranged in a geometric arrangement known as a Mill's Cross. For information regarding Mill's Cross arrays, the interested reader is directed to *Microwave Scanning Antenna*, R. C. Hansen, Ed., Academic Press (1964), and *Principals of Underwater Sound* (3rd. Ed.), R. J. Urick (1983). While microphone array 111 could comprise only one microphone, the benefits of multiple microphones (to provide signal gain and directivity, whether in a fully or sparsely populated array or vector, will be clear to those skilled in the art. It will be clear to those skilled in the art how to mechanically baffle microphone array 111 so as to attenuate sounds coming from other than detection zone 107 and to protect microphone array 111 from the environment (e.g., rain, snow, wind, UV).

Microphone array 111 is advantageously rigidly mounted on support 109 so that the predetermined relative spatial positioning of the individual microphones are maintained. A typical deployment geometry is shown in FIG. 1. For this geometry, the horizontal distance of the sensor from the nearest lane with traffic is assumed to be less than 15 feet. The vertical height above the road is advantageously between 20 and 35 feet depending on performance requirements and available mounting facilities. It will be clear to those skilled in the art that the deployment geometry is flexible and can be modified for specific objectives. Furthermore, it will be clear to those skilled in the art how to position and orient microphone array 111 so that it is well suited to receive sounds from detection zone 107.

Referring to FIG. 1, each omni-directional microphone in microphone array 111 receives an acoustic signal which comprises the sound radiated from, inter alia, motor vehicle 103, motor vehicle 105 and ambient noise. Each microphone in microphone array 111 then transforms its respective acoustic signal into an analog electric signal and outputs the analog electric signal on a distinct lead on electrical bus 113 in ordinary fashion. The respective analog electric signals are then fed into detection circuit 115.

To determine the presence or passage of a motor vehicle in detection zone 107, the respective signals from microphone array 111 are processed in ordinary fashion to provide the sensory spatial discrimination needed to isolate sounds emanating from within detection zone 107. The ability to control the spatial directivity of microphone array 111 is called "beam-forming". It will be clear to those skilled in the art that electronically controlled steerable beams can be used to form multiple detection zones.

Figure 3:
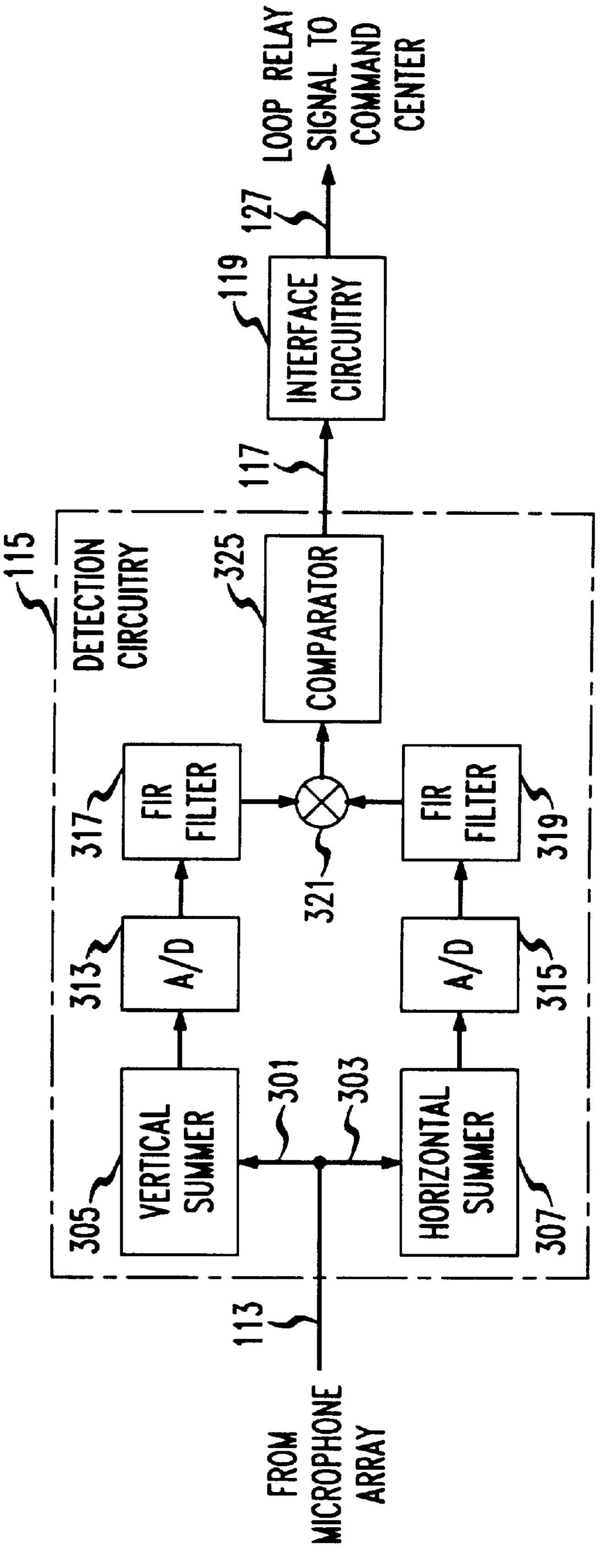
FIG. 3 is a block diagram of the internals of an illustrative detection circuit as shown in FIG. 1.

Referring to FIG. 3, detection circuit 115 advantageously comprises bus 301, vertical summer 305, analog-to-digital converter 313, finite-impulse-response filter 317, bus 303, horizontal summer 307, analog-to-digital converter 315, finite-impulse-response filter 319, multiplier 321 and comparator 325. The electric signals from microphone 201, microphone 203, microphone 205, microphone 207 and microphone 209 (as shown in FIG. 2) are fed, via bus 301, into vertical summer 305 which adds them in well-known fashion and feeds the sum into analog-to-digital converter 313. While in the illustrative embodiment, vertical summer 305 performs an unweighted addition of the respective signals, it will be clear to those skilled in the art that vertical summer 305 can alternately perform a weighted addition of the respective signals so as to shape and steer the formed beam (i.e., to change the position of detection zone 107). It will also be clear to those skilled in the art that illustrative embodiments of the present invention can comprise two or more detection circuits, so that one microphone array can gather the data for two or more detection zones, in each lane or in different lanes.

Analog-to-digital converter 313 receives the output of vertical summer 305, samples it at 32,000 samples per second in well-known fashion. The output of analog-to-digital converter 313 is fed into finite-impulse response filter 317.

Finite-impulse response filter 317 is preferably a bandpass filter with a lower passband edge of 4 KHz, an upper passband edge of 6 KHz and a stopband rejection level of 60 dB below the passband (i.e., stopband levels providing 60 dB of rejection). It will be clear to those skilled in the art how to make and use finite-impulse-response filter 317.

The electric signals from microphone 211, microphone 213, microphone 205, microphone 215 and microphone 217 (as shown in FIG. 2) are fed, via bus 303, into horizontal summer 307 which adds them in well-known fashion and feeds the sum into analog-to-digital converter 315. While in the illustrative embodiment, horizontal summer 307 performs an unweighted addition of the respective signals, it will be clear to those skilled in the art that horizontal summer 307 can alternately perform a weighted addition of the respective signals so as to shape and steer the formed beam (i.e., to change the position of detection zone 107).

Analog-to-digital converter 315 receives the output of horizontal summer 305, samples it at 32,000 samples per second in well-known fashion. The output of analog-to-digital converter 313 is fed into finite-impulse response filter 319.

Finite-impulse response filter 319 is preferably a bandpass filter with a lower passband edge of 4 KHz, an upper passband edge of 6 KHz and a stopband rejection level of 60 dB below the passband (i.e., stopband levels providing p60 dB of rejection). It will be clear to those skilled in the art how to make and use finite-impulse-response filter 319.

Multiplier 321 receives as input the output of finite-impulse-response filter 317 and finite-impulse-response filter 319 and performs a sample by sample multiplication of the respective inputs and then performs a coherent averaging of the respective products. The output of multiplier 321 is fed into comparator 325. It will be clear to those skilled in the art how to make and use multiplier 321.

Comparator 325 advantageously, on a sample-by-sample basis, compares the magnitude of each sample to a predetermined threshold and creates a binary signal which indicates whether a motor vehicle is within detection zone 107. While the predetermined threshold can be a constant, it will be clear to those skilled in the art that the predetermined threshold can be adaptable to various weather conditions and/or other environmental conditions which can change over time. The output of comparator 325 is fed into interface circuitry 119.

Interface circuitry 119 receives the output of detection circuitry 115 and preferably creates an output signal such that the output signal is asserted when a motor vehicle is within detection zone 107 and such that the output signal is retracted when there is no motor vehicle within the detection zone 107. Interface circuitry 119 also makes any electrical conversions necessary to interface to the circuitry at the highway department's command center. Interface circuitry 119 can also perform statistical analysis on the output of detection circuitry 115 so as to output a signal which has other characteristics than that described above.

What is claimed is:

1. An apparatus for detecting the presence of a motor vehicle (105) in a detection zone (107), said apparatus comprising:

a first electro-acoustic transducer (201) for receiving a first acoustic signal radiated from said motor vehicle and for converting said first acoustic signal into a first electric signal that represents said first acoustic signal;

a second electro-acoustic transducer (203) for receiving a second acoustic signal radiated from said motor vehicle and for converting said second acoustic signal into a second electric signal that represents said second acoustic signal;

spatial discrimination circuitry (305) for creating a third electric signal, based on said first electric signal and said second electric signal, that substantially represents the acoustic energy emanating from said detection zone;

frequency discrimination circuitry (317) for creating a fourth signal based on said third signal; and interface circuitry (119) for creating an output signal based on said fourth signal such that said output signal is asserted when said motor vehicle (105) is within detection zone (107) and whereby said output signal is retracted when said motor vehicle (105) is not within said detection zone (107).

2. The apparatus of claim 1 wherein said frequency discrimination circuitry (317) comprises a bandpass filter.

3. The apparatus of claim 1 wherein said frequency discrimination circuitry (317) comprises a bandpass filter with a lower passband edge of substantially close to 4 KHz and an upper passband edge of substantially close to 6 KHz.

4. A method for detecting and signaling the presence of a motor vehicle (105) in a detection zone (107), said method comprising the steps of:

receiving, with a first electro-acoustic transducer (201), a first acoustic signal radiated from said motor vehicle and converting said first acoustic signal into a first electric signal that represents said first acoustic signal;

receiving, with a second electro-acoustic transducer (203), a second acoustic signal radiated from said motor vehicle and converting said second acoustic signal into a second electric signal that represents said second acoustic signal;

creating a third electric signal, with spatial discrimination circuitry (115), based on the sum of said first electric signal and said second electric signal such that said third signal is indicative of the acoustic energy emanating from said detection zone; and creating a binary loop relay signal, with interface circuitry (119), based on said third electric signal such that said loop relay signal is asserted when said motor vehicle (105) within said detection zone (107) and such that said loop relay signal is retracted when said motor vehicle (105) is not within said detection zone (107).

* * * * *